(12) United States Patent
Rabb, Jr.

(10) Patent No.: US 9,352,637 B1
(45) Date of Patent: May 31, 2016

(54) PROTECTIVE VEHICULAR ATTACHMENT TO PREVENT DAMAGE TO WINDOWS

(71) Applicant: James Clark Rabb, Jr., San Francisco, CA (US)

(72) Inventor: James Clark Rabb, Jr., San Francisco, CA (US)

( * ) Notice: Subject to any disclaimer, the term of this patent is extended or adjusted under 35 U.S.C. 154(b) by 0 days.

(21) Appl. No.: 14/807,671

(22) Filed: Jul. 23, 2015

(51) Int. Cl.
| | |
|---|---|
| *E06B 3/68* | (2006.01) |
| *B60J 1/20* | (2006.01) |
| *E06B 9/02* | (2006.01) |
| *E06B 9/00* | (2006.01) |
| *E06B 9/01* | (2006.01) |

(52) U.S. Cl.
CPC ............. *B60J 1/2094* (2013.01); *E06B 9/02* (2013.01); *E06B 2009/002* (2013.01); *E06B 2009/015* (2013.01)

(58) Field of Classification Search
CPC .... B60J 1/2094; E06B 9/02; E06B 2009/002; E06B 2009/015
USPC ................................ 49/50, 55, 57, 61, 62, 70
See application file for complete search history.

(56) References Cited

U.S. PATENT DOCUMENTS

| | | | | |
|---|---|---|---|---|
| 1,330,932 | A | * | 2/1920 | Bickerton .......................... 49/56 |
| 4,653,562 | A | * | 3/1987 | Moss et al. ..................... 160/105 |
| 4,854,364 | A | * | 8/1989 | Junker ........................... 160/105 |
| 5,524,694 | A | * | 6/1996 | Arapis ...................... 160/370.21 |
| 5,570,542 | A | * | 11/1996 | Cameron ......................... 49/463 |
| 5,603,183 | A | * | 2/1997 | Giovinazzi ........................ 49/56 |
| 5,713,624 | A | * | 2/1998 | Tower ............................ 296/152 |
| 5,768,827 | A | * | 6/1998 | Hackett ............................. 49/57 |
| 5,829,388 | A | * | 11/1998 | Rosso ............................ 119/416 |
| 5,916,074 | A | * | 6/1999 | Tracy .............................. 49/141 |
| 6,192,628 | B1 | * | 2/2001 | Pinheiro et al. .................... 49/70 |
| 6,508,039 | B2 | * | 1/2003 | Gezelin ........................... 52/507 |
| 6,669,259 | B2 | * | 12/2003 | Murray et al. .............. 296/24.46 |
| 7,036,869 | B1 | * | 5/2006 | Stipanovich ................... 296/152 |
| 7,114,760 | B2 | * | 10/2006 | Cameron ....................... 296/152 |
| 7,150,246 | B1 | | 12/2006 | Weimer |
| 7,416,013 | B2 | * | 8/2008 | Murray et al. ................. 160/105 |
| 7,832,455 | B1 | * | 11/2010 | Johnston et al. .............. 160/372 |
| 2005/0091923 | A1 | * | 5/2005 | Pleasants .......................... 49/57 |
| 2007/0240833 | A1 | | 10/2007 | Watson |
| 2008/0005967 | A1 | * | 1/2008 | Johnson et al. .................... 49/61 |
| 2009/0243339 | A1 | * | 10/2009 | Orr et al. .................. 296/190.03 |

FOREIGN PATENT DOCUMENTS

| | | | | |
|---|---|---|---|---|
| GB | 2247486 A | * | 3/1992 | ............ B60R 27/00 |
| WO | WO 2009088107 A1 | * | 7/2009 | ............... E06B 9/02 |

* cited by examiner

*Primary Examiner* — Jerry Redman
(74) *Attorney, Agent, or Firm* — Plager Schack LLP

(57) ABSTRACT

A protective window attachment for use with a vehicle includes a frame assembly detachably coupled to the vehicle and having an upper assembly pivotably mounted to the lower assembly, the upper assembly having an upper outer frame placed against edges of the window and upper bars having top ends coupled to the upper outer frame, each upper bar extending over the window and having a convex curvature, the lower assembly having a lower outer frame pivotably mounted to the upper outer frame, and a plurality of lower bars, the lower bars having top ends pivotably mounted to bottom ends of the upper bars and bottom ends coupled to the lower outer frame. The convex curvature of the upper bars creates sufficient space between the upper bars and the window to prevent external impact forces from reaching the window.

7 Claims, 5 Drawing Sheets

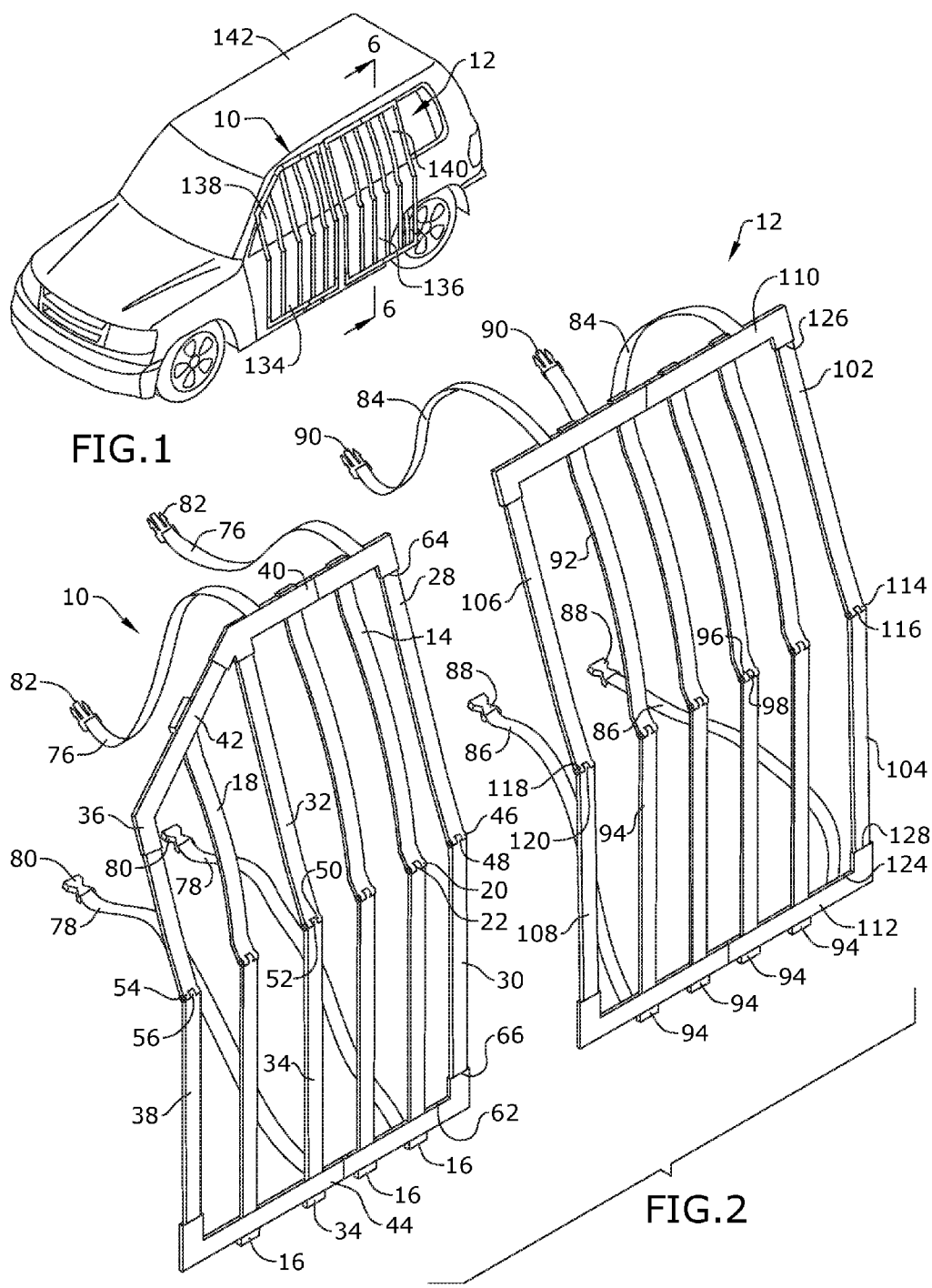

PROTECTIVE VEHICULAR ATTACHMENT TO PREVENT DAMAGE TO WINDOWS

BACKGROUND

The embodiments herein relate generally to devices for protecting windows of a vehicle.

Most vehicles such as cars and trucks are parked outdoors in an open environment for a period of time. Typically, the windows of the vehicle are exposed and unprotected. These vehicles are desirable to thieves, robbers or other criminals because the windows are vulnerable to an attack. Specifically, individuals can smash open one or more windows with a tool and steal contents within the vehicle and/or drive the vehicle away.

Several window attachments exist as disclosed in U.S. Pat. No. 7,150,246 and U.S. Patent Application Publication 2007/0240833, which disclose restraint devices that are designed to prevent pets from falling through a window when the vehicle is in motion. However, these restraint devices are not strong enough to protect the window from a swinging object such as a crow bar, bat, or the like.

As such, there is a need in the industry for a protective attachment that is secured to a vehicle's window that addresses the limitations of the prior art, which protects the window from damage or breakage from impact forces generated by an external object.

SUMMARY

A protective window attachment for use with a window on a door of the vehicle is provided. The protective window attachment is configured to prevent damage to the window from impact forces generated by an external source. The protective window attachment comprises a frame assembly detachably coupled to the vehicle proximate the window, the frame assembly comprising an upper assembly pivotably mounted to the lower assembly, the upper assembly comprising an upper outer frame configured to be placed against edges of the window and a plurality of upper bars comprising top ends coupled to the upper outer frame, each upper bar extending over the window and comprising a convex curvature directed away from the window, the lower assembly comprising a lower outer frame pivotably mounted to the upper outer frame, and a plurality of lower bars, the plurality of lower bars comprising top ends pivotably mounted to bottom ends of the plurality of upper bars and bottom ends coupled to the lower outer frame, wherein the convex curvature of the plurality of upper bars creates sufficient space between the upper bars and the window to prevent the impact forces from reaching the window, thereby protecting the window from damage.

BRIEF DESCRIPTION OF THE FIGURES

The detailed description of some embodiments of the invention will be made below with reference to the accompanying figures, wherein the figures disclose one or more embodiments of the present invention.

FIG. 1 depicts a perspective view of certain embodiments of the protective window attachment shown in use;

FIG. 2 depicts a perspective view of certain embodiments of the protective window attachment;

DETAILED DESCRIPTION OF CERTAIN EMBODIMENTS

Figure 3:
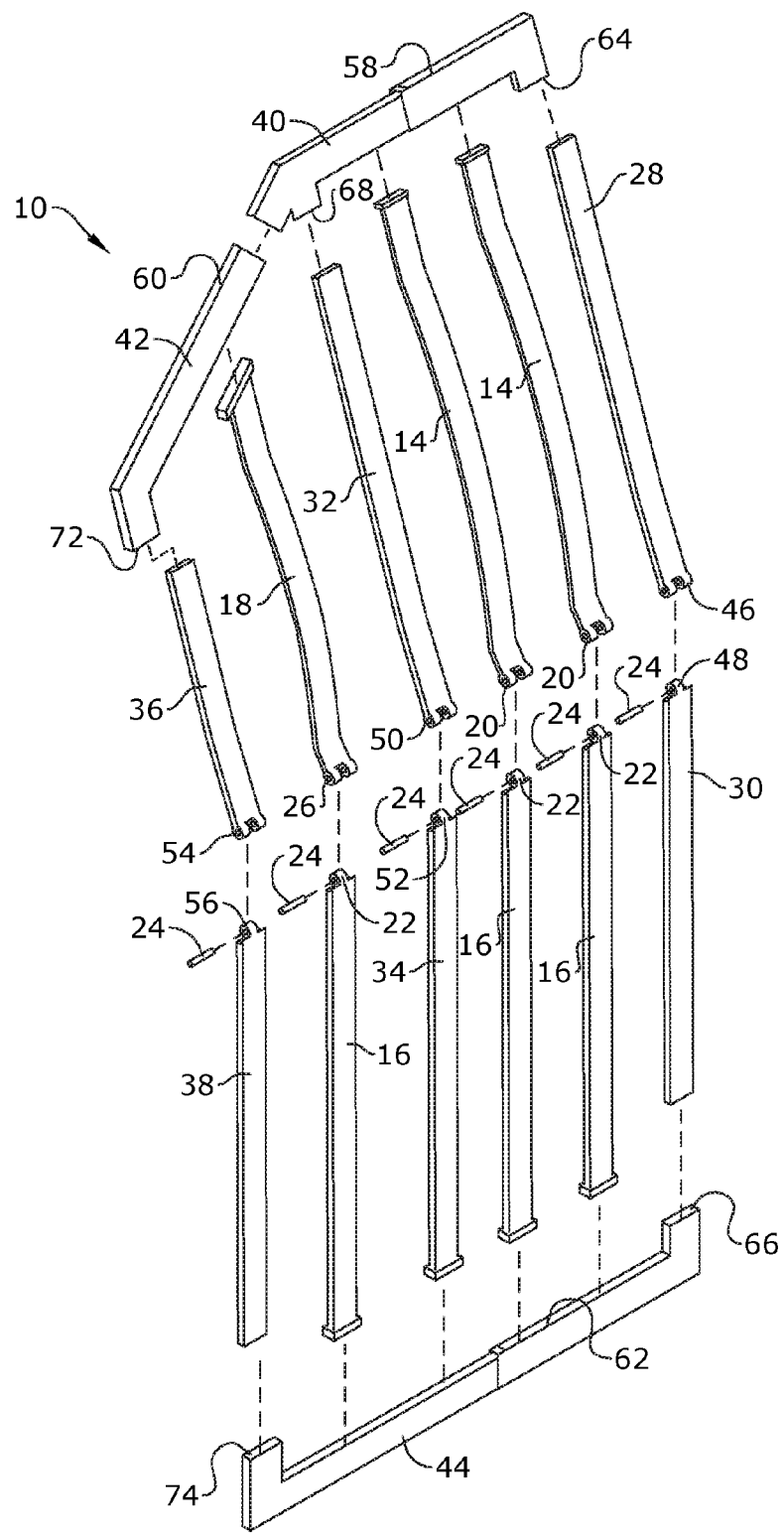
FIG. 3 depicts an exploded view of front window assembly 10 of certain embodiments of the protective window attachment, omitting straps for clarity.
Figure 4:
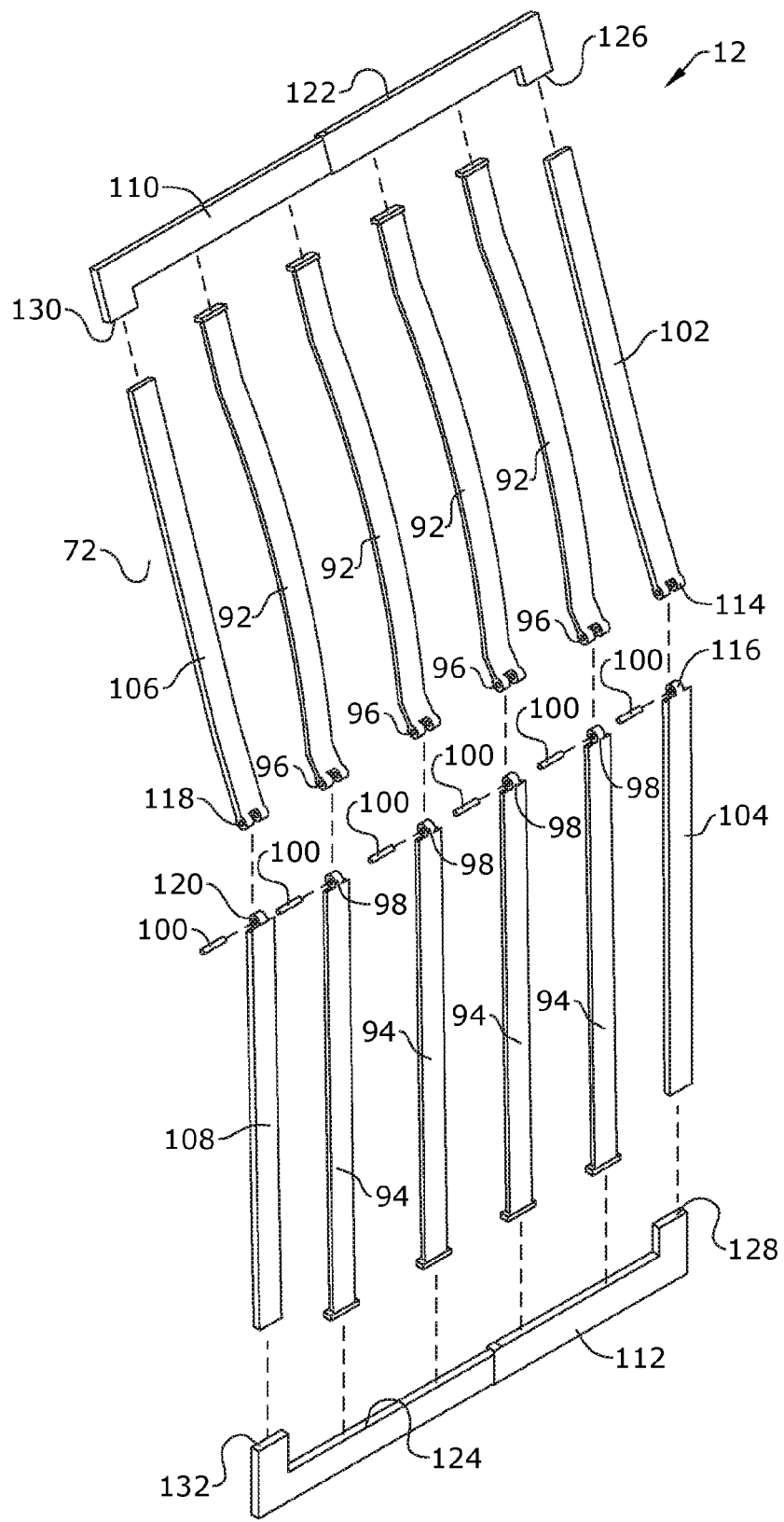
FIG. 4 depicts an exploded view of rear window assembly 12 of certain embodiments of the protective window attachment, omitting straps for clarity.
Figure 5:
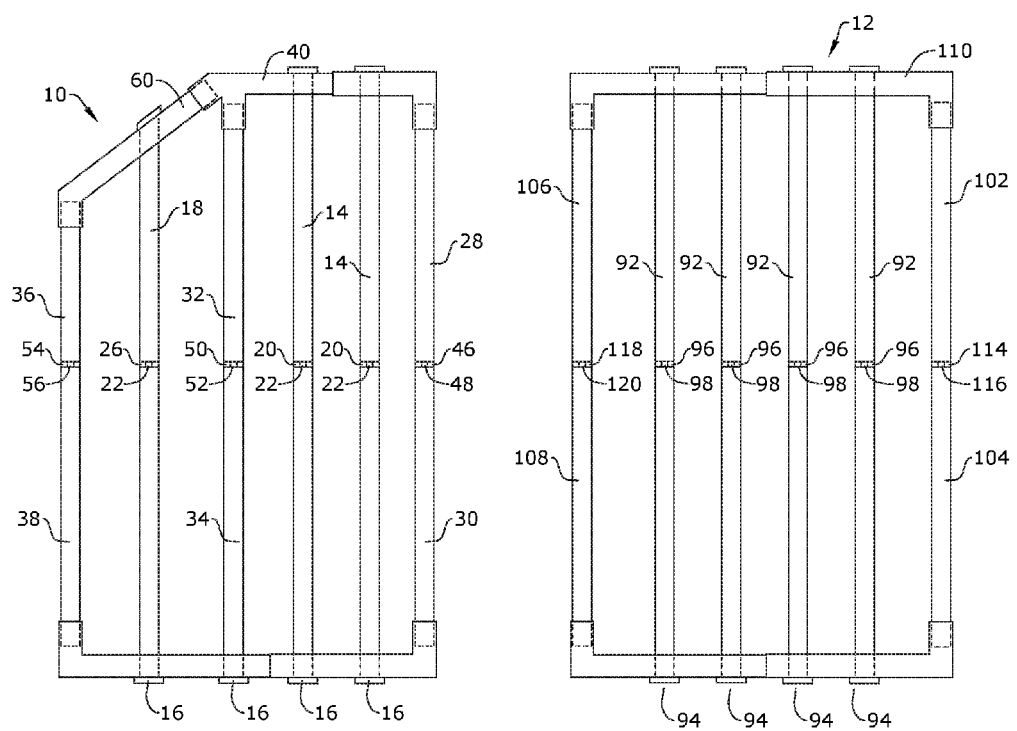
FIG. 5 depicts a front view of certain embodiments of the protective window attachment, omitting straps for clarity.

As depicted in FIG. 1, the protective window attachments comprise front window assembly 10 and rear window assembly 12, which are configured to be secured to the exterior of front window 138 on front door 134 and rear window 140 on rear door 136 of vehicle 142. Once front and rear window assemblies 10, 12 are secured to doors 134, 136, front window 138 and rear window 140 are protected from impact forces generated from an external source. These external sources can originate from any object in motion such as a crow bar, bat, other tool, or the like.

As depicted in FIGS. 2-5, front window assembly 10 comprises an upper portion pivotably mounted to a lower portion. The upper portion of front window assembly 10 comprises straight top rail 40 mechanically coupled to slanted top rail 42. Forward upper stile 36 comprises a top end mechanically coupled to forward upper stile slot 72 of slanted top rail 42 and a bottom end comprising forward upper stile hinge knuckles 54. Middle upper stile 32 and aft upper stile 28 both comprise top ends mechanically coupled to middle upper stile slot 68 and aft upper stile slot 64 of straight top rail 40, and lower ends comprising middle upper stile hinge knuckles 50 and aft upper stile hinge knuckles 46. Short front upper bar 18 comprises a top end disposed within slanted top rail slot 60 and a bottom end comprising short upper bar hinge knuckles 26. Similarly, long front upper bars 14 comprise top ends disposed within straight top rail slot 58 and bottom ends comprising long upper bar hinge knuckles 20.

The lower portion of front window assembly 10 comprises bottom rail 44 having bottom rail slot 62. Forward lower stile 38 comprises a top end with forward lower stile hinge knuckle 56 pivotably mounted to forward upper stile hinge knuckles 54 by front hinge pin 24. Forward lower stile 38 comprises a bottom end mechanically coupled to forward lower stile slot 74 of bottom rail 44. Similarly, aft lower stile 30 comprises a top end with aft lower stile hinge knuckle 48 pivotably mounted to aft upper stile hinge knuckles 46 by front hinge pin 24. Aft lower stile 30 comprises a bottom end mechanically coupled to aft lower stile slot 66 of bottom rail 44. Middle lower stile 34 comprises a top end with middle lower stile hinge knuckle 52 pivotably mounted to middle upper stile hinge knuckles 50 by front hinge pin 24. Front lower bars 16 comprise top ends with lower bar hinge knuckles 22 pivotably mounted to short upper bar hinge knuckles 26 or long upper bar hinge knuckles 20. Front lower bars 16 comprise bottom ends disposed within bottom rail slot 62 of bottom rail 44.

Rear window assembly 12 comprises components substantially similar to those in front window assembly 10. Rear window assembly 12 comprises an upper portion pivotably mounted to a lower portion. The upper portion of rear window assembly 12 comprises top rail 110 with top rail slot 122.

Forward upper stile 106 comprises a top end mechanically coupled to forward upper stile slot 130 and a bottom end comprising forward upper stile hinge knuckles 118. Aft upper stile 102 comprises a top end mechanically coupled to aft upper stile slot 126 and a bottom end comprising aft upper stile hinge knuckles 114. Rear upper bars 92 comprise top ends disposed within top rail slot 122 of top rail 110 and bottom ends comprising upper bar hinge knuckles 96.

The lower portion of rear window assembly 12 comprises bottom rail 112 having bottom rail slot 124. Forward lower stile 108 comprises a top end with forward lower stile hinge knuckle 120 pivotably mounted to forward upper stile hinge knuckles 118 by rear hinge pin 100. Forward lower stile 108 comprises a bottom end mechanically coupled to forward lower stile slot 132 of bottom rail 112. Similarly, aft lower stile 104 comprises a top end with aft lower stile hinge knuckle 116 pivotably mounted to aft upper stile hinge knuckles 114 by rear hinge pin 100. Aft lower stile 104 comprises a bottom end mechanically coupled to aft lower stile slot 128 of bottom rail 112. Rear lower bars 94 comprise top ends with lower bar hinge knuckles 98 pivotably mounted to upper bar hinge knuckles 96 by rear hinge pins 100. Rear lower bars 94 comprise bottom ends disposed within bottom rail slot 124 of bottom rail 112.

Figure 6:
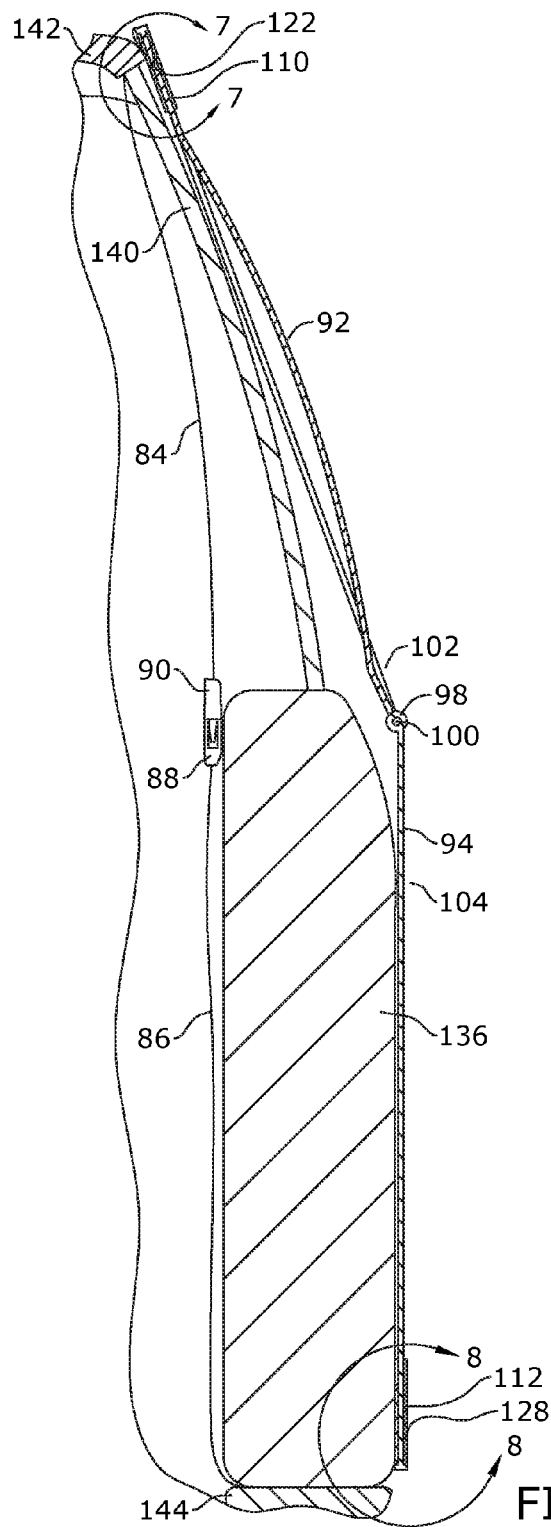
FIG. 6 depicts a section view of certain embodiments of the protective window attachment, taken along line 6-6 in FIG. 1.

Short front upper bar 18, long front upper bars 14 and rear upper bars 92 each comprises a convex curvature that is directed away from front window 138 or rear window 140. This curvature creates sufficient space between these bars and the window to prevent external impact forces from reaching the window. FIG. 6 depicts the convex curvature of rear upper bar 92 above rear window 140.

In some embodiments, certain bar members may be slidably adjusted. For example, long front upper bars 14 and corresponding front lower bars 16 may be slidably mounted to straight top rail 40 and bottom rail 44. Similarly, rear upper bars 92 and corresponding rear lower bars 94 may be slidably mounted to top rail 110 and bottom rail 112. In these embodiments, straight top rail 40 and bottom rail 44 may each comprise a pair of telescoping members to adjust the overall width of front window assembly 10. Similarly, top rail 110 and bottom rail 112 may each comprise a pair of telescoping members to adjust the overall width of rear window assembly 12. This is beneficial to permit front window assembly 10 and rear window assembly 12 to fit different sized windows.

In certain embodiments of the invention, straps are coupled to front and rear window assemblies 10, 12 to help secure the assemblies to vehicle 142. In front window assembly 10, front upper straps 76 are coupled to straight top rail 40 and front lower straps 78 are coupled to bottom rail 44. Front lower straps 78 comprise front female buckles 80 configured to detachably couple to front male buckles 82 of front upper straps 76. In rear window assembly 12, rear upper straps 84 are coupled to top rail 110 and rear lower straps 86 are coupled to bottom rail 112. Rear lower straps 86 comprise rear female buckles 88 configured to detachably couple to rear male buckles 90 of rear upper straps 84.

Figure 7:
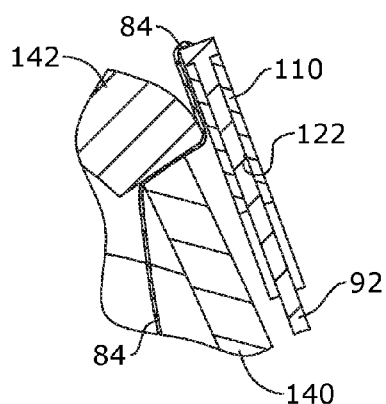
FIG. 7 depicts a section view of certain embodiments of the protective window attachment, taken along line 7-7 in FIG. 6.
Figure 8:
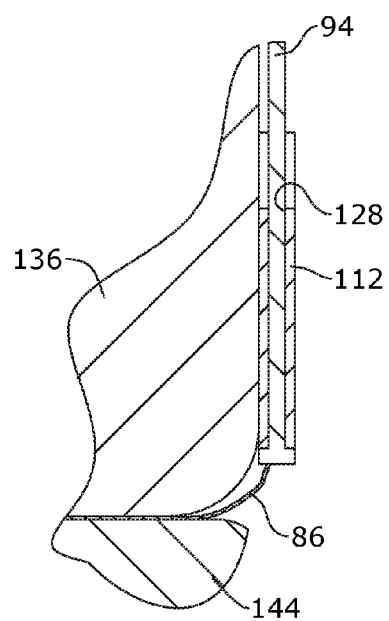
FIG. 8 depicts a section view of certain embodiments of the protective window attachment, taken along line 8-8 in FIG. 6.

In operation, front and rear window assemblies 10, 12 are secured to the exterior of front and rear doors 134, 136 to protect front and rear windows 138, 140. This is completed by securing front and rear straps 76, 78, 84, 86 within the interior of front and rear doors 134, 136. Once the doors are closed, front and rear straps 76, 78, 84, 86 keep front and rear window assemblies 10, 12 affixed to the exterior of vehicle 142. In these configurations, front and rear window assemblies 10, 12 cover front and rear windows 138, 140 and protect them from damage from external sources. FIGS. 6-8 depict section views of the securement of rear window assembly 12 to rear door 136. In this embodiment, rear upper strap 84 extends between the roof of vehicle 142 and rear window 140. Rear lower strap 86 extends between vehicle frame 144 and rear door 136. Rear upper strap 84 is secured to rear lower strap 86 by engaging rear male buckle 90 with rear female buckle 88.

It shall be appreciated that the components of the protective window attachments described in several embodiments herein may comprise any known materials in the field and be of any color, size and/or dimensions. For example, the main structural components of the window attachments may be made from plastic, metal, other materials, or the like. Any mechanical fasteners known in the field such as screws, bolts, nails, or the like, may be used to secure components of the window attachment together. It shall be appreciated that the components of the protective window attachments described herein may be manufactured and assembled using any known techniques in the field.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. A protective window attachment for use with a window on a door of the vehicle, the protective window attachment configured to prevent damage to the window from impact forces generated by an external source, the protective window attachment comprising:

a frame assembly detachably coupled to the vehicle proximate the window, the frame assembly comprising an upper assembly pivotably mounted to the lower assembly, the upper assembly comprising an upper outer frame configured to be placed against edges of the window and a plurality of upper bars comprising top ends coupled to the upper outer frame, each upper bar extending over the window and comprising a convex curvature directed away from the window, the lower assembly comprising a lower outer frame pivotably mounted to the upper outer frame, and a plurality of lower bars, the plurality of lower bars comprising top ends pivotably mounted to bottom ends of the plurality of upper bars and bottom ends coupled to the lower outer frame;

wherein the convex curvature of the plurality of upper bars creates sufficient space between the upper bars and the window to prevent the impact forces from reaching the window, thereby protecting the window from damage.

2. The protective window attachment of claim 1, wherein the top ends of the plurality of upper bars are slidably mounted to the upper outer frame and the bottom ends of the plurality of lower bars are slidably mounted to the lower outer frame.

3. The protective window attachment of claim 2, further comprising a first set of straps coupled to the upper outer frame and a second set of straps coupled to the lower outer frame, wherein each strap in the first set of straps comprises a first fastener and each strap in the second set of straps comprises a second fastener, wherein the first and second sets of straps are disposed around an interior of the door to permit the first fasteners of the first set of straps to engage with the second fasteners of the second set of straps.

4. The protective window attachment of claim 3, wherein the upper outer frame comprises a top rail comprising a generally horizontal member coupled to a slanted member, a first stile assembly coupled to both the slanted member and the lower outer frame, a second stile assembly coupled to both a junction of the horizontal member and the slanted member, and the lower outer frame, and a third stile assembly coupled to both the horizontal member and the lower outer frame.

5. The protective window attachment of claim 4, wherein each stile assembly comprises an upper stile pivotably mounted to a lower stile.

6. The protective window attachment of claim 5, wherein at least one of the plurality of upper bars is positioned between the first and second stile assemblies.

7. The protective window attachment of claim 6, wherein at least one of the plurality of upper bars is positioned between the second and third stile assemblies.

* * * * *